(12) United States Patent
Ma et al.

(10) Patent No.: US 12,509,344 B2
(45) Date of Patent: Dec. 30, 2025

(54) MICROELECTROMECHANICAL SYSTEMS DIE

(71) Applicant: Knowles Electronics, LLC, Itasca, IL (US)

(72) Inventors: Yunfei Ma, Buffalo Grove, IL (US); Ann George, Itasca, IL (US); Shubham Shubham, Schaumburg, IL (US)

(73) Assignee: Knowles Electronics, LLC, Itasca, IL (US)

( * ) Notice: Subject to any disclaimer, the term of this patent is extended or adjusted under 35 U.S.C. 154(b) by 486 days.

(21) Appl. No.: 18/090,361

(22) Filed: Dec. 28, 2022

(65) Prior Publication Data

US 2024/0217807 A1 Jul. 4, 2024

(51) Int. Cl.
*B81B 3/00* (2006.01)

(52) U.S. Cl.
CPC .... *B81B 3/0008* (2013.01); *B81B 2203/0127* (2013.01); *B81B 2203/04* (2013.01)

(58) Field of Classification Search
CPC .......... B81B 3/0008; B81B 2203/0127; B81B 2203/04
See application file for complete search history.

(56) References Cited

U.S. PATENT DOCUMENTS

| 2006/0280319 | A1* | 12/2006 | Wang | B81B 3/0072 381/172 |
| 2011/0154905 | A1* | 6/2011 | Hsu | G01L 9/0073 324/686 |
| 2015/0016656 | A1* | 1/2015 | Chen | H04R 7/06 381/398 |

OTHER PUBLICATIONS

NPL Search History (Year: 2024).*

* cited by examiner

*Primary Examiner* — Yasser A Abdelaziez
(74) *Attorney, Agent, or Firm* — FLENER IP & BUSINESS LAW; Zareefa B. Flener; Yongae Jun

(57) ABSTRACT

A microelectromechanical system (MEMS) die includes a substrate, a diaphragm made from a conductive material and supported over the substrate, and a backplate separated from the diaphragm and disposed on a side of the diaphragm opposite the substrate. The backplate includes a central electrode layer disposed on a surface facing the diaphragm, and a ring electrode layer disposed on the surface facing the diaphragm, the ring electrode layer spaced from and surrounding the central electrode layer.

18 Claims, 3 Drawing Sheets

MICROELECTROMECHANICAL SYSTEMS DIE

FIELD OF THE DISCLOSURE

The present disclosure relates generally to a microelectromechanical systems (MEMS) die, and more particularly to a MEMS die including a free-plate conductive diaphragm supported relative to a backplate having both a main electrode and an additional ring electrode disposed around the main electrode.

BACKGROUND

Microelectromechanical systems (MEMS) free-plate diaphragms are not constrained around their peripheries, but rather are supported at a single peripheral region by a cantilever-like supporting structure. Such free-plate diaphragms are therefore substantially free to move relative to adjacent surfaces, but can also get stuck upon contact with an adjacent surface due to the force of surface stiction. For example, a free-plate diaphragm can get stuck to a substrate over which it is supported due to the force of the surface stiction.

Such free-plate diaphragms are often made of conductive material so that the diaphragm can be un-stuck from the substrate by application of an electrostatic force to the diaphragm. Unfortunately, applying an electrostatic force to disengage a stuck diaphragm undesirably adds to the start-up time of a device employing the free-plate diaphragm. Increasing the applied electrostatic force can expedite the disengagement process, but suffers from increased parasitic noise.

DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope.

Figure 3:
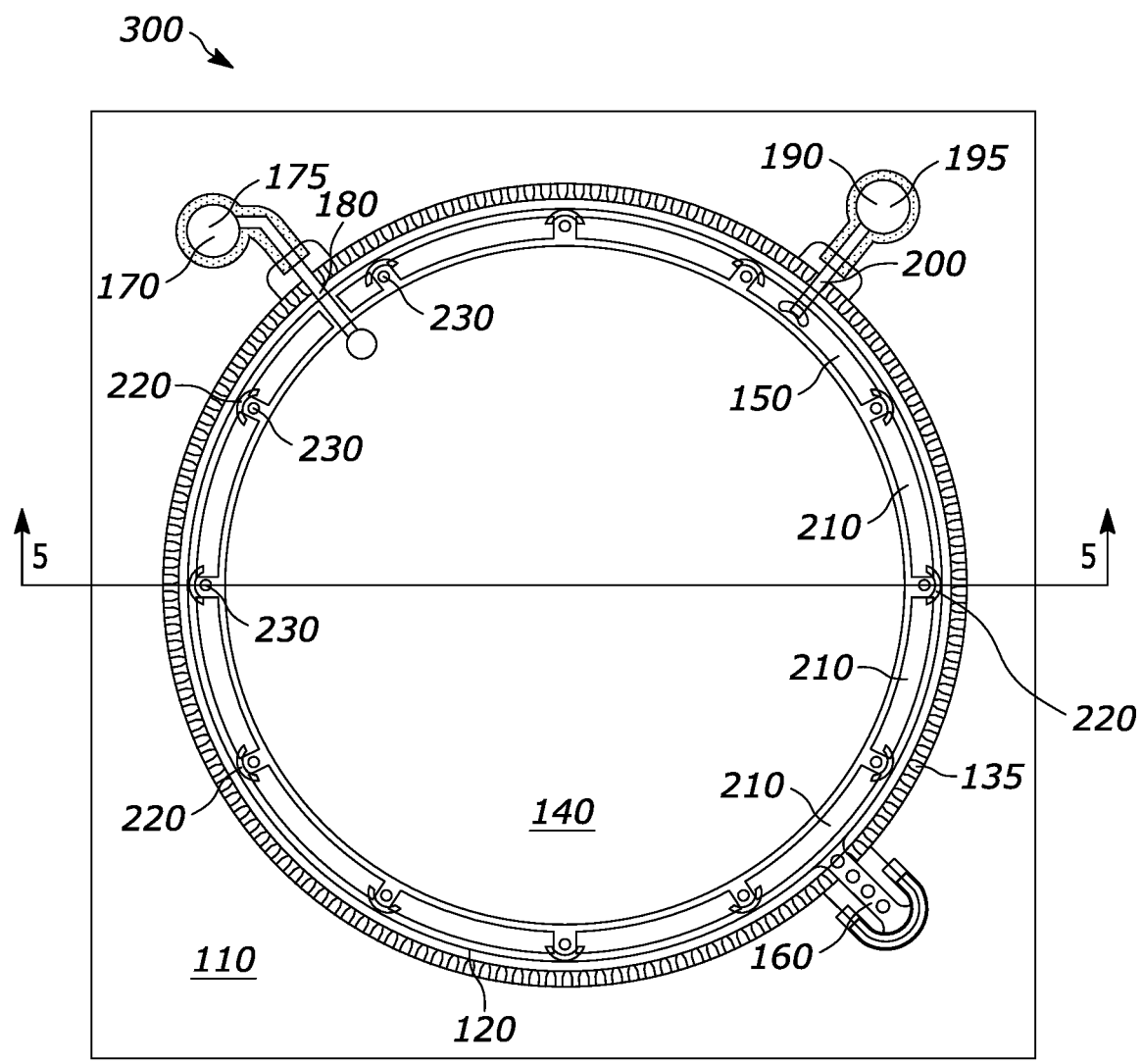
FIG. 3 is a partially transparent top plan view of an exemplary MEMS die according to another embodiment.
Figure 4:
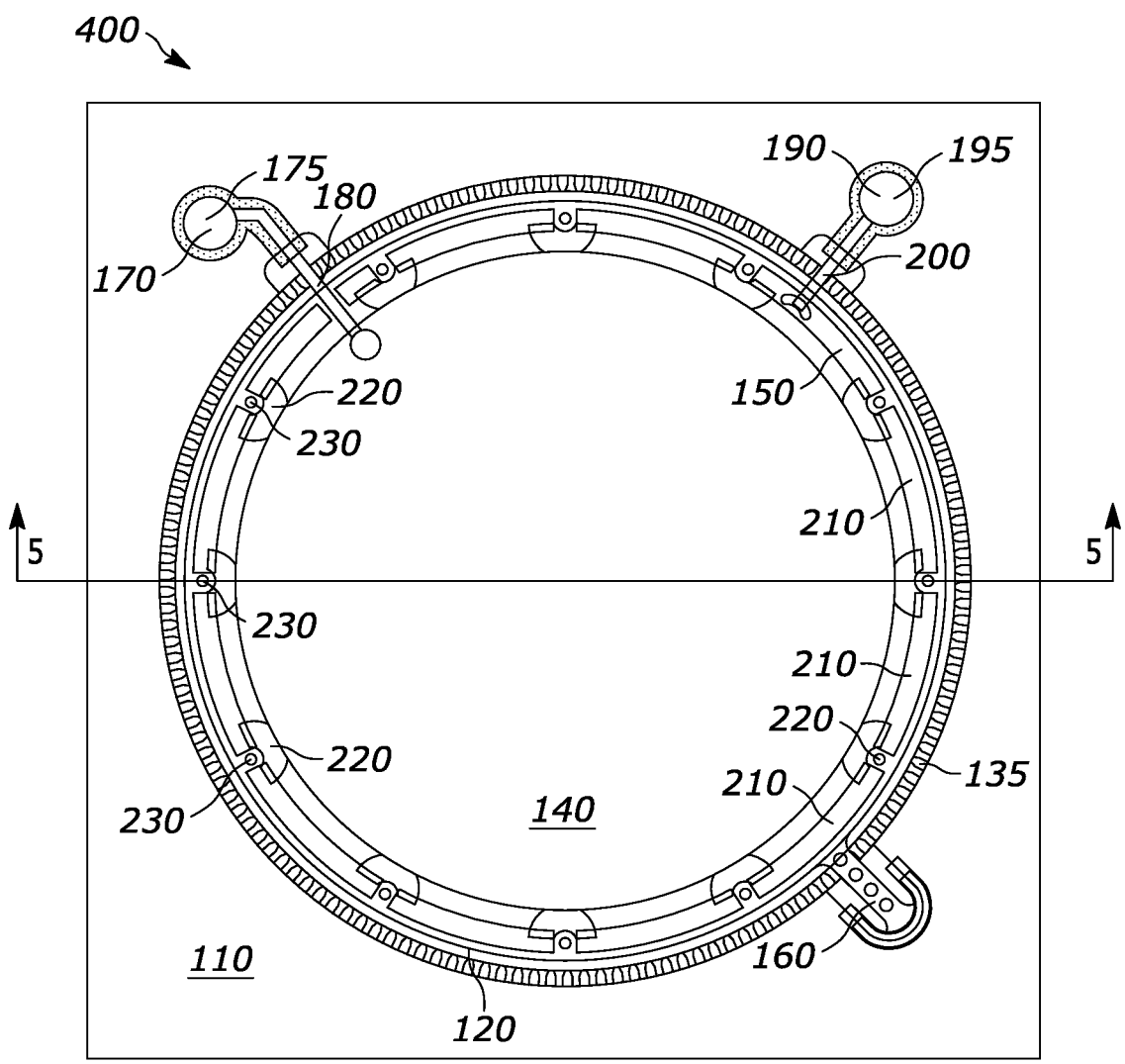
FIG. 4 is a partially transparent top plan view of an exemplary MEMS die according to yet another embodiment.
Figure 5:
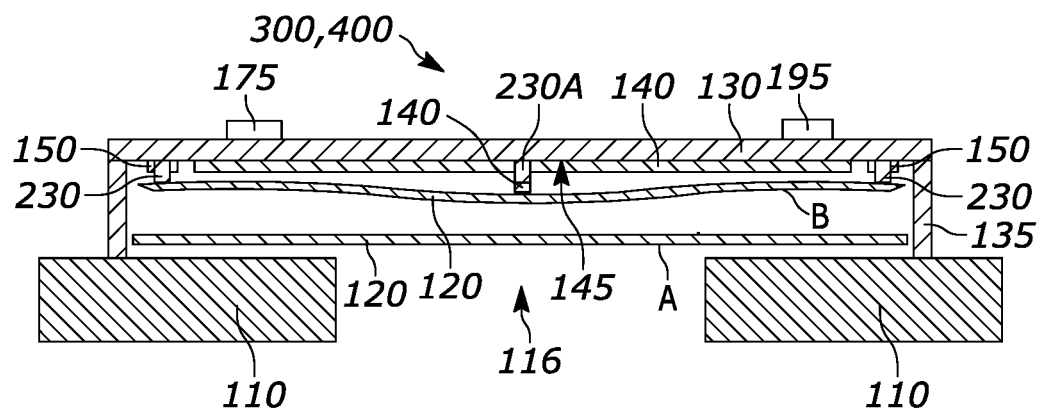

FIG. 5 is a schematic cross-sectional view of the MEMS dies of FIGS. 3 and 4 taken generally along the lines 5-5 of FIGS. 3 and 4.

In the following detailed description, various embodiments are described with reference to the appended drawings. The skilled person will understand that the accompanying drawings are schematic and simplified for clarity. Like reference numerals refer to like elements or components throughout. Like elements or components will therefore not necessarily be described in detail with respect to each figure.

DETAILED DESCRIPTION

According to various embodiments described herein, a MEMS die comprises a substrate, a diaphragm made from a conductive material and supported over the substrate, and a backplate separated from the diaphragm and disposed on a side of the diaphragm opposite the substrate. The backplate comprises a central electrode layer disposed on a surface facing the diaphragm, and a ring electrode layer disposed on the surface facing the diaphragm, the ring electrode layer spaced from and surrounding the central electrode layer. In an embodiment the diaphragm is supported over the substrate by a cantilevered anchor extending from an edge of the diaphragm. In an embodiment the central electrode layer and the ring electrode layer are electrically connected to a common voltage source.

According to an embodiment, the ring electrode layer comprises a continuous ring of material. According to another embodiment, the MEMS die further comprises a plurality of posts extending from the backplate toward the diaphragm, wherein the plurality of posts is spaced from and surrounding the central electrode layer, wherein the ring electrode layer comprises a plurality of ring segments, and wherein the ring segments alternate with the posts, and wherein the ring segments are connected by smaller connector segments. According to an embodiment the connector segments extend radially inwardly from the plurality of ring segments. According to another embodiment the connector segments extend radially outwardly from the plurality of ring segments.

According to an embodiment the backplate comprises a central electrode layer disposed on a surface facing the diaphragm, wherein the central electrode layer is connected to a voltage source, and wherein the minimum required level of voltage applied to the central electrode layer to overcome surface stiction between the diaphragm and the substrate is a first predetermined level of voltage. According to an embodiment the backplate further comprises a ring electrode layer disposed on the surface facing the diaphragm, the ring electrode layer spaced from and surrounding the central electrode layer, and wherein the ring electrode layer is further connected to the voltage source so that the minimum required level of voltage applied to the central electrode layer and the ring electrode layer to overcome surface stiction between the diaphragm and the substrate is a second predetermined level of voltage that is less than the first predetermined level of voltage.

A plurality of MEMS devices can be manufactured in a single batch process. Individual portions of the batch process representative of individual MEMS devices are known as dies. Accordingly, a number of MEMS dies can be manufactured in a single batch process and then cut apart or otherwise separated for further fabrication steps or for their ultimate use, which for example without limitation includes as a transducer or sensor.

Figure 1:
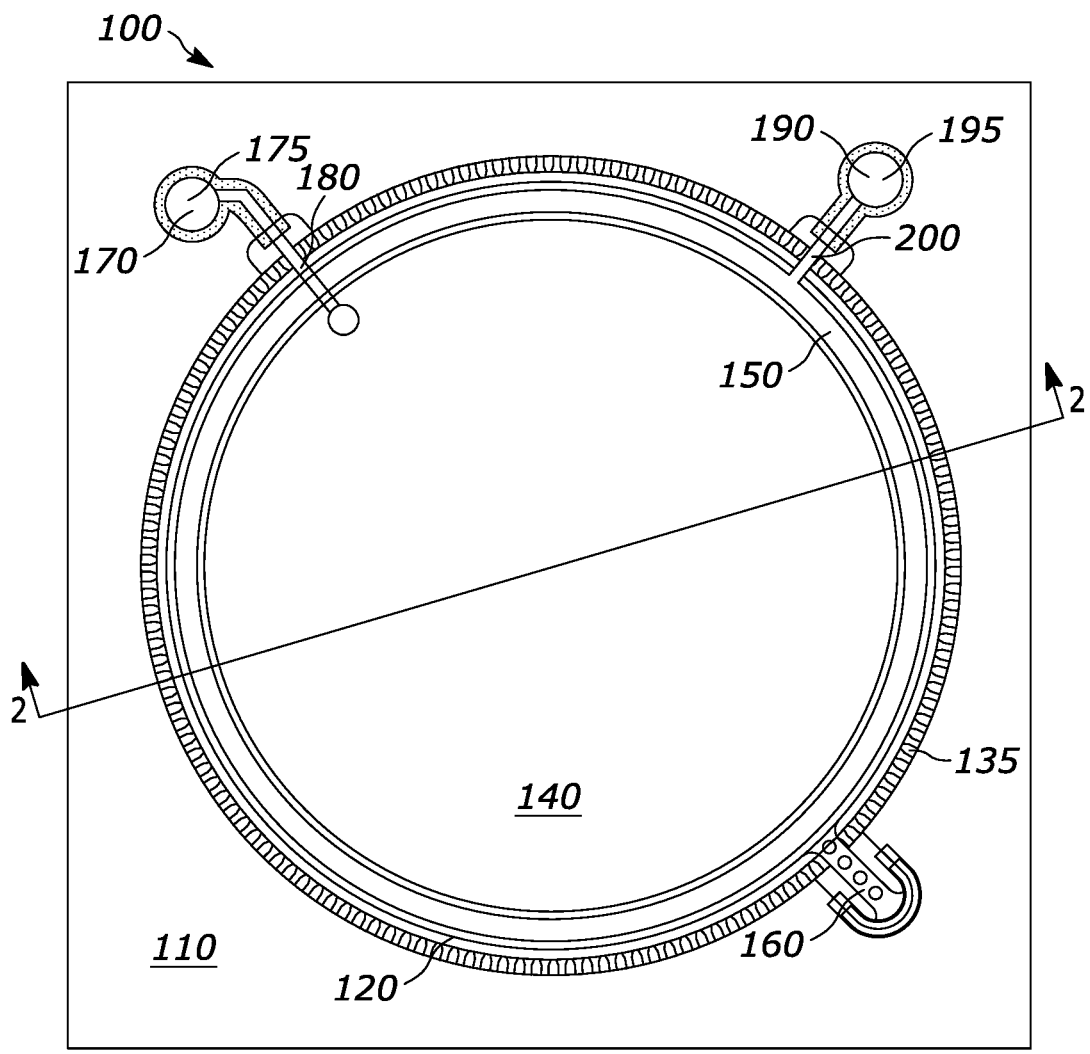
FIG. 1 is a partially transparent top plan view of an exemplary MEMS die according to an embodiment.
Figure 2:
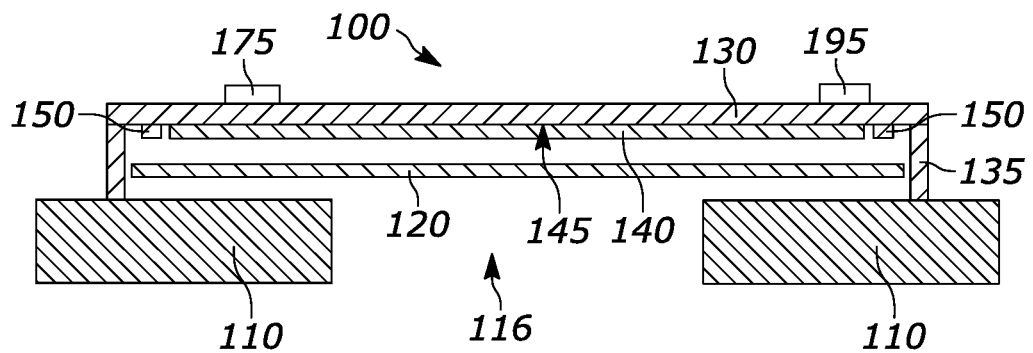
FIG. 2 is a schematic cross-sectional view of the MEMS die of FIG. 1 taken generally along the lines 2-2 of FIG. 1.

Referring to FIGS. 1 and 2, a MEMS die 100 according to an embodiment is shown schematically in a partially transparent top plan view in FIG. 1 and in an exemplary cross-sectional view in FIG. 2, which is taken generally along the lines 2-2 in FIG. 1. In an embodiment the MEMS die 100 includes a substrate 110 having an opening 116 formed therein. In an embodiment the substrate 110 is a rectangular solid but in other embodiments it can be any shape. Opening 116 is typically round but can be any shape.

In an embodiment a diaphragm 120 made, for example without limitation, from a conductive material is supported over the substrate 110. In an embodiment the diaphragm 120 is supported over the substrate 110 by a cantilevered anchor 160 (see FIG. 1) extending from an edge of the diaphragm 120. A peripheral edge of the diaphragm 120 is visible in FIG. 1. In an embodiment a backplate 130 is disposed separated from the diaphragm 120 on a side of the diaphragm 120 opposite the substrate 110. In embodiment the backplate 130 is attached to the substrate by a peripheral wall 135, shown in both FIGS. 1 and 2.

In an embodiment the backplate 130 comprises a central electrode layer 140 disposed on a surface 145 facing the diaphragm 120. In an embodiment a ring electrode layer 150 is disposed on the surface 145 facing the diaphragm 120, wherein the ring electrode layer 150 is spaced from and surrounds the central electrode layer 140. The addition of the ring electrode layer 150 separated from the central electrode layer 140 can increase the electrostatic force that can be applied to the diaphragm 120 over the force applicable via the central electrode layer 140 alone. In an embodiment adding the ring electrode layer 150 to the central electrode layer 140 can reduce the voltage required to produce an electrostatic force sufficient to disengage the diaphragm 120 from being stuck to the substrate 110 by the force of contact stiction. Without being held to theory, such disengagement voltage can be reduced by about 10% by the addition of the ring electrode layer 150 versus the central electrode layer 140 alone. A reduction in required disengagement voltage is a desirable feature as part of an overall device startup process.

In an embodiment materials used for the substrate 110 can, for example without limitation, include silicon, glass, gallium arsenide (GaAs), and/or polysilicon. In an embodiment materials used for the diaphragm 120 can, for example without limitation, include silicon, polysilicon, silicon nitride (SiN), aluminum or any other metal, metal compounds, or conductive materials. In an embodiment materials used for the backplate 130 including the posts 230 can, for example without limitation, include silicon nitride (SiN), polysilicon, aluminum or any other metal, metal compounds, or conductive materials. In an embodiment materials used for the central electrode layer 140 and the ring electrode layer 150 can, for example without limitation, include a conductive material including polysilicon, aluminum or any other metal, or metal compounds.

In an embodiment the central electrode layer 140 is electrically connected to a first voltage source 170, for example a first contact pad 175, via a first trace or wire 180. In an embodiment the ring electrode layer 150 is electrically connected to a second voltage source 190, for example a second contact pad 195, via a second trace or wire 200. In an embodiment the central electrode layer 140 and the ring electrode layer 150 are electrically connected to a common voltage source, for example that is electrically connected to both of the first and second contact pads 175, 195. Without being held to theory, connecting the central electrode layer 140 and the ring electrode layer 150 to maintain the same voltage potential can function to reduce the disengagement voltage without adding parasitic noise and while maintaining sensitivity.

For example, in an embodiment the minimum required level of voltage applied to the central electrode layer 140 to overcome surface stiction between the diaphragm 120 and the substrate 110 is a first predetermined level of voltage. In an embodiment the backplate 130 further comprises the ring electrode layer 150 disposed on the surface 145 facing the diaphragm 120, wherein the ring electrode layer 150 is spaced from and surrounds the central electrode layer 140. In an embodiment the ring electrode layer 150 is further connected to the same voltage source as is the central electrode layer 140, so that the minimum required level of voltage applied to the central electrode layer 140 and the ring electrode layer 150 to overcome surface stiction between the diaphragm 120 and the substrate 110 is a second predetermined level of voltage that is less than the first predetermined level of voltage.

In the embodiment of the MEMS die 100 illustrated in FIGS. 1 and 2, the ring electrode layer 150 comprises a continuous and uniform ring of material. Referring to FIGS. 3-5, other embodiments of a MEMS die 300, 400 have a ring electrode layer 150 having some structural differences relative to the MEMS die 100. In the embodiments of the die 300, 400 the ring electrode layer 150 comprises a plurality of ring segments 210 instead of a continuous uniform ring. Adjacent ring segments of the plurality of ring segments 210 are separated around the ring by a plurality of posts 230 extending from the backplate 130. The ring segments in the plurality of ring segments 210 are connected by a plurality of smaller connector segments 220 that are configured to go around the posts 230. In the embodiment of the MEMS die 300 as illustrated in FIG. 3, the connector segments 220 extend radially outwardly from the plurality of ring segments 210 to get around the posts 230. In the embodiment of the MEMS die 400 as illustrated in FIG. 4, the connector segments 220 extend radially inwardly from the plurality of ring segments 210 to get around the posts 230.

FIG. 5 illustrates an exemplary cross-sectional schematic view of the MEMS die 300, 400 shown in FIGS. 3 and 4 taken generally along the lines 5-5 in FIGS. 3 and 4 and shown without the connector segments 220 for clarity. As can be seen in FIG. 5, each of the posts 230 extends away from the backplate 130. The diaphragm 120 is illustrated in a pre-released or unbiased position at position A. It is in this position that the diaphragm may get stuck to the substrate 110 via the force of surface stiction. The diaphragm 120 is also illustrated in a released or biased position at position B, wherein the plurality of posts 230 provide support for the diaphragm 120.

FIG. 5 also illustrates an embodiment including a center post 230A. In an embodiment the central electrode layer 140 includes a portion disposed on the center post 230A. The center post 230A also provides support for the diaphragm 120 in the released or biased position.

The ring electrode layer 150, whether in the form of a continuous ring of material as in the MEMS die 100 or in the form of a plurality of ring segments 210 connected by a plurality of connector segments 220 as in the MEMS dies 300, 400, provides additional electrostatic force to help disengage the diaphragm 120 from being stuck to the substrate 110 by the force of contact stiction, which is a phenomenon that is inherent to all MEMS devices. For example without limitation, MEMS devices that utilize a free-plate diaphragm and that could benefit from having a ring electrode layer 150 include microphones, resonators, MEMS mirrors, and motion sensors.

Steps in a production process utilized to produce the MEMS die 100 as described hereinabove include etching, masking, patterning, cutting, boring, and/or release steps executed on a workpiece. All of the steps are not described in detail herein. However, generally the structures comprising the MEMS die 100 are applied onto a workpiece in particular layers or patterns and the spaces between the structures are created utilizing sacrificial material, or are otherwise bored or etched out of a solid block of material.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A microelectromechanical system (MEMS) die, comprising:
    a substrate;
    a diaphragm made from a conductive material and supported over the substrate; and
    a backplate separated from the diaphragm and disposed on a side of the diaphragm opposite the substrate;
    wherein the backplate comprises a central electrode layer disposed on a surface facing the diaphragm, and a ring electrode layer disposed on the surface facing the diaphragm, the ring electrode layer spaced from and surrounding the central electrode layer; and
    wherein the central electrode layer and the ring electrode layer are electrically connected to a common voltage source.

2. The die of claim 1, wherein the diaphragm is supported over the substrate by a cantilevered anchor extending from an edge of the diaphragm.

3. The die of claim 1, wherein the ring electrode layer comprises a continuous ring of material.

4. The die of claim 1, further comprising a plurality of posts extending from the backplate toward the diaphragm, wherein the plurality of posts is spaced from and surrounding the central electrode layer, and wherein the ring electrode layer comprises a plurality of ring segments, wherein the ring segments alternate with the posts, and wherein the ring segments are connected by smaller connector segments.

5. The die of claim 4, wherein the connector segments extend radially inwardly from the plurality of ring segments.

6. The die of claim 4, wherein the connector segments extend radially outwardly from the plurality of ring segments.

7. A microelectromechanical system (MEMS) die, comprising:
    a substrate;
    a diaphragm made from a conductive material and supported over the substrate; and
    a backplate separated from the diaphragm and disposed on a side of the diaphragm opposite the substrate;
    wherein the backplate comprises a central electrode layer disposed on a surface facing the diaphragm, wherein the central electrode layer is connected to a voltage source, and wherein the minimum required level of voltage applied to the central electrode layer to overcome surface stiction between the diaphragm and the substrate is a first predetermined level of voltage;
    the backplate further comprising a ring electrode layer disposed on the surface facing the diaphragm, the ring electrode layer spaced from and surrounding the central electrode layer, and wherein the ring electrode layer is further connected to the voltage source so that the minimum required level of voltage applied to the central electrode layer and the ring electrode layer to overcome surface stiction between the diaphragm and the substrate is a second predetermined level of voltage that is less than the first predetermined level of voltage.

8. The die of claim 7, wherein the diaphragm is supported over the substrate by a cantilevered anchor extending from an edge of the diaphragm.

9. The die of claim 7, wherein the ring electrode layer comprises a continuous ring of material.

10. The die of claim 7, further comprising a plurality of posts extending from the backplate toward the diaphragm, wherein the plurality of posts is spaced from and surrounding the central electrode layer, and wherein the ring electrode layer comprises a plurality of ring segments, wherein the ring segments alternate with the posts, and wherein the ring segments are connected by smaller connector segments.

11. The die of claim 10, wherein the connector segments extend radially inwardly from the plurality of ring segments.

12. The die of claim 10, wherein the connector segments extend radially outwardly from the plurality of ring segments.

13. A microelectromechanical system (MEMS) die, comprising:
    a substrate;
    a diaphragm made from a conductive material and supported over the substrate by a cantilevered anchor extending from an edge of the diaphragm;
    a backplate separated from the diaphragm and disposed on a side of the diaphragm opposite the substrate; and
    a plurality of posts extending from the backplate toward the diaphragm, wherein the plurality of posts is spaced from and surrounding the central electrode layer, and wherein the ring electrode layer comprises a plurality of ring segments, wherein the ring segments alternate with the posts, and wherein the ring segments are connected by smaller connector segments;
    wherein the backplate comprises a central electrode layer disposed on a surface facing the diaphragm, and a ring electrode layer disposed on the surface facing the diaphragm, the ring electrode layer spaced from and surrounding the central electrode layer.

14. The die of claim 13, wherein the central electrode layer is connected to a first voltage source and the ring electrode layer is electrically connected to a second voltage source.

15. The die of claim 14, wherein the minimum required level of voltage applied to the central electrode layer to overcome surface stiction between the diaphragm and the substrate is a first predetermined level of voltage.

16. The die of claim 15, wherein the first and second voltage sources are the same voltage source, and wherein the minimum required level of voltage applied to the central electrode layer and the ring electrode to overcome surface stiction between the diaphragm and the substrate is a second predetermined level of voltage, wherein the second predetermined level is less than the first predetermined level.

17. The die of claim 13, wherein the ring electrode layer comprises a continuous ring of material.

18. The die of claim 13, wherein the connector segments extend radially inwardly or radially outwardly from the plurality of ring segments.

* * * * *